United States Patent [19]

Kutchie

[11] Patent Number: 5,439,237
[45] Date of Patent: Aug. 8, 1995

[54] SNOWMOBILE SKI WHEELS

[76] Inventor: Steven A. Kutchie, Sunnyside Estates, #69, Ishpeming, Mich. 49849

[21] Appl. No.: 226,933
[22] Filed: Apr. 13, 1994
[51] Int. Cl.⁶ ............................................. B62B 13/18
[52] U.S. Cl. ...................................... 280/11; 280/8; 280/9; 280/28
[58] Field of Search ............... 280/8, 9, 10, 11, 7.12, 280/43.14, 43.22, 43.24, 767, 30

[56] References Cited

U.S. PATENT DOCUMENTS

| | | |
|---|---|---|
| 1,308,937 | 7/1917 | Crane ........................................ 280/8 |
| 3,218,006 | 11/1965 | Albright ................................... 280/9 |
| 3,545,560 | 12/1970 | Fox ........................................... 280/28 |
| 3,570,617 | 3/1971 | O'Day . |
| 3,593,814 | 7/1971 | Bauler . |
| 3,630,581 | 12/1971 | Gostomski . |
| 3,709,512 | 1/1973 | Albertson ............................... 280/28 |
| 3,717,211 | 2/1973 | Carter . |
| 3,810,662 | 5/1974 | Commanda . |
| 4,603,869 | 8/1986 | Maxwell ................................. 280/11 |

Primary Examiner—Brian L. Johnson
Assistant Examiner—Min S. Yu

[57] ABSTRACT

The ski supports of a snowmobile are each provided with a plurality of wheel assemblies, with each wheel assembly arranged for pivoting relative to the ski support from a first position elevating the wheels above a top surface of each ski support to a second locked position wherein the wheels are directed below the ski supports.

2 Claims, 2 Drawing Sheets

SNOWMOBILE SKI WHEELS

BACKGROUND OF THE INVENTION

1. Field of the Invention

The field of invention relates to snowmobile support structure, and more particularly pertains to new snowmobile ski wheels wherein the same are provided for the operative projection of support wheels below each of a plurality of ski supports of an associated snowmobile.

2. Description of the Prior Art

Snowmobile support structure, and particularly the use of wheel members, are indicated in U.S. Pat. Nos. 3,593,814; 3,630,581; 3,570,617; 3,810,662; and 3,717,211.

The instant invention attempts to overcome deficiencies of the prior art by providing for snowmobile ski wheels that are arranged for ease of pivoting operative positioning relative to snowmobile ski support and in this respect, the present invention substantially fulfills this need.

SUMMARY OF THE INVENTION

In view of the disadvantages inherent in the known types of snowmobile ski wheels now present in the prior art, the present invention provides snowmobile ski wheels wherein the same includes plural wheel assemblies mounted to each of a plurality of snowmobile ski supports to permit the operative positioning of support wheels below ski support members.

To attain this, the present invention provides a plurality of wheel assemblies mounted to the ski supports of a snowmobile, with each wheel assembly arranged for pivoting relative to the ski support from a first position elevating the wheels above a top surface of each ski support to a second locked position wherein the wheels are directed below the ski supports.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is an object of the present invention to provide new snowmobile ski wheels which may be easily and efficiently manufactured and marketed.

It is a further object of the present invention to provide new snowmobile ski wheels which is of a durable and reliable construction.

An even further object of the present invention is to provide new snowmobile ski wheels which is susceptible of a low cost of manufacture with regard to both and labor, and which accordingly is then susceptible of low prices of sale to the consuming public, thereby making such snowmobile ski wheels economically available to the buying public.

Still yet another object of the present invention is to provide new snowmobile ski wheels which provides in the apparatuses and methods of the prior art some of the advantages thereof, while simultaneously overcoming some of the disadvantages normally associated therewith.

Even still yet another object of the present invention is to provide new snowmobile ski wheels in which the ski supports of a snowmobile are each provided with a plurality of wheel assemblies, with each wheel assembly arranged for pivoting relative to the ski support from a first position elevating the wheels above a top surface of each ski support to a second locked position wherein the wheels are directed below the ski supports.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
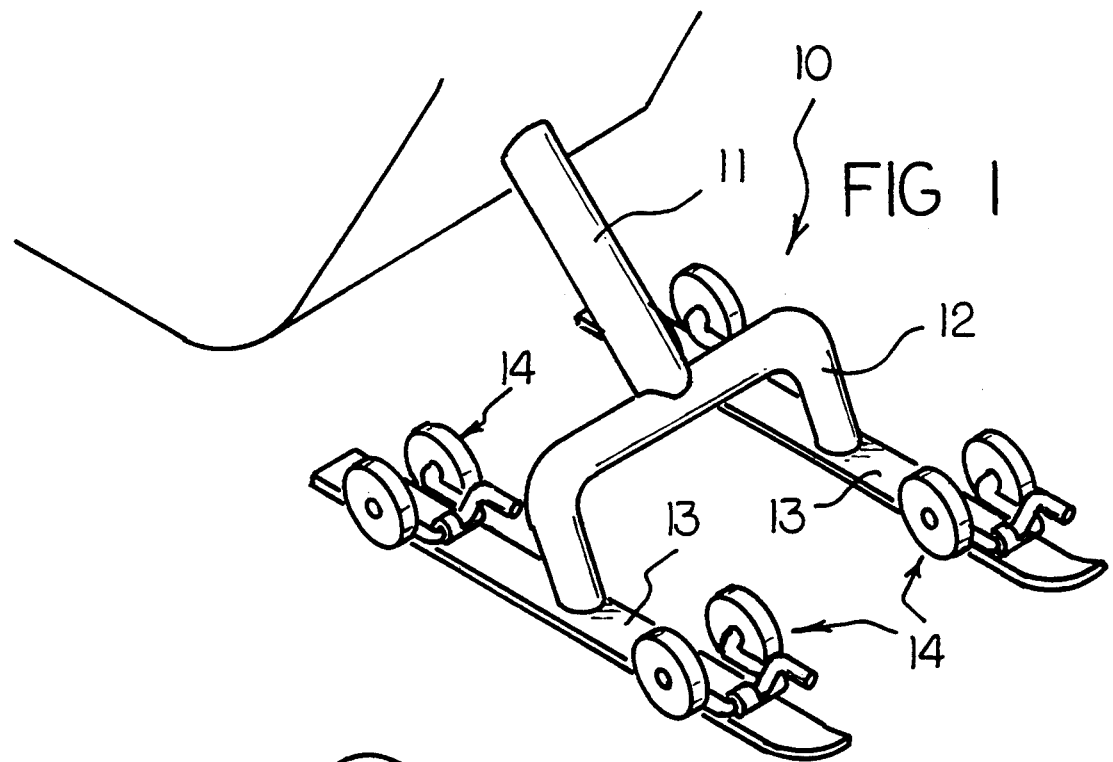
FIG. 1 is an isometric illustration of the invention.

With reference now to the drawings, and in particular to FIGS. 1–4 thereof, new snowmobile ski wheels embodying the principles and concepts of the present invention and generally designated by the reference numeral 10 will be described.

More specifically, the snowmobile ski wheel arrangement 10 of the instant invention comprises a snowmobile having a central support strut 11 extending therefrom and terminating in a U-shaped ski support 12, with each leg of the U-shaped ski support 12 including a ski member 13 arranged in a parallel, coextensive relationship, such as indicated in FIG. 1. A plurality of wheel assemblies 14 are mounted to each of the ski members 13. Each wheel assembly 14 includes spaced lock flanges 15 (see FIG. 2) defining a flange gap 19 therebetween, wherein lock bores 16 are provided, with one of such lock bores directed through each of the lock flanges, and the lock bores arranged in an axially aligned relationship. A support tube 17 is mounted to a top of the ski 13, having a support tube slot 18 aligned with the flange gap 19.

Figure 2:
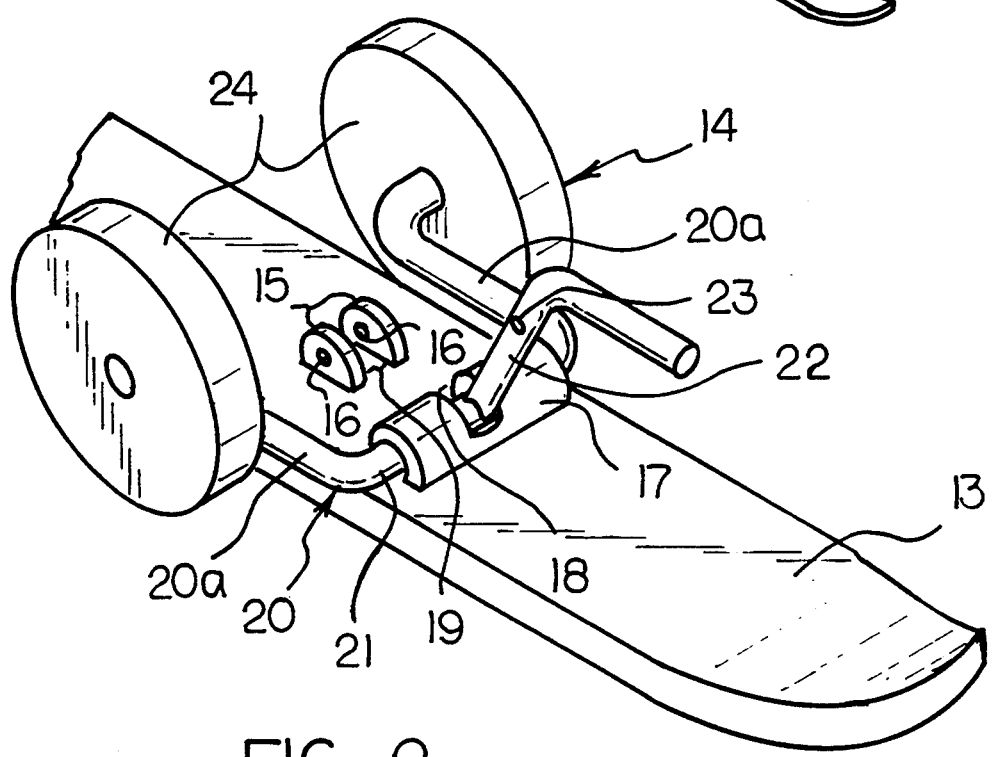
FIG. 2 is an enlarged isometric illustration of an individual wheel assembly of the invention.
Figure 3:
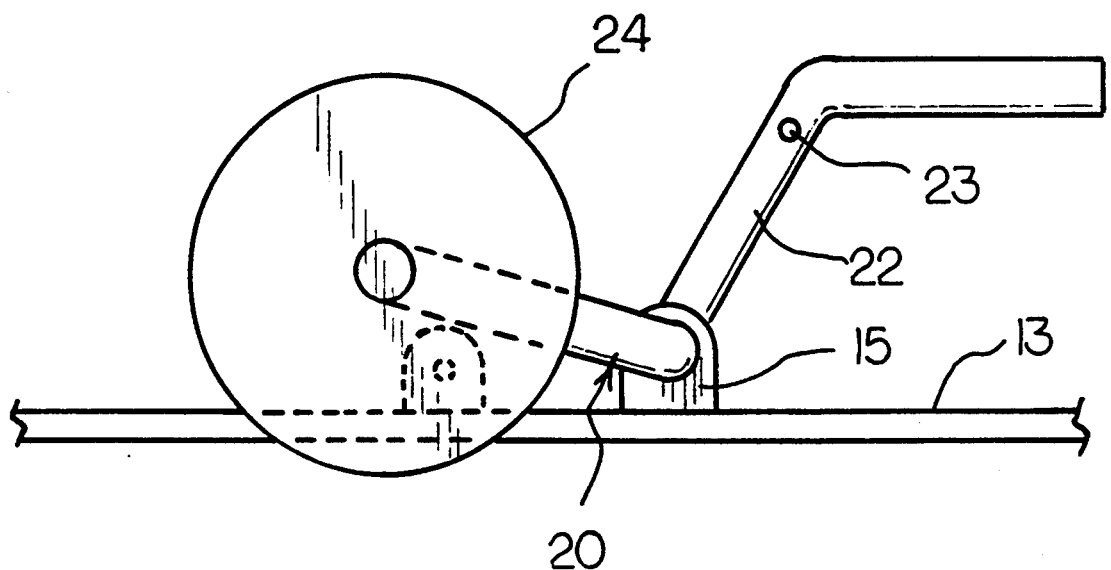
FIG. 3 is an orthographic side view of the wheel assembly in a first position.
Figure 4:
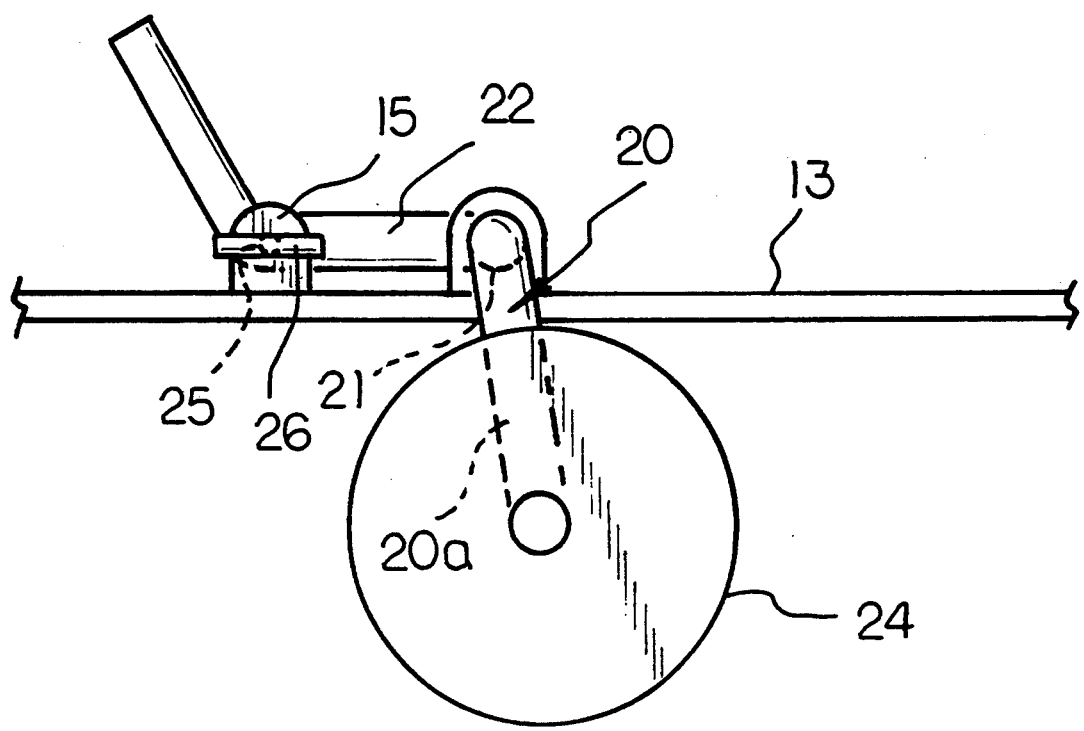
FIG. 4 is an orthographic side view of the wheel assembly in a second lowered position.

A U-shaped wheel support bracket 20 extends through the support tube 17, with each leg 20a of the U-shaped wheel support bracket including a wheel member 24 rotatably mounted thereon positioning such wheel member to each side of the ski member 13. A latch leg 22 is integrally and orthogonally mounted relative to the central web 21 of the U-shaped wheel support bracket 20, with the latch leg 22 projecting through the slot 18. The latch leg 22 movably positionable from a first position spaced from the gap 19 with the wheels positioned above the ski 13, such as illustrated in FIGS. 2 and 3, to a second position to be received between the flanges 15 within the gap, such that a latch leg opening 23 is aligned with the lock bores 16 to receive a lock pin 25 through the lock bores 16 and the latch leg opening 23. The lock pin includes a lock pin handle 26, as illustrated in FIG. 4, providing for ease of latching of the latch leg 22 between the lock flanges 15 to project the wheel members 24 below each respective ski member 13 for rotatably supporting the snowmobile structure relative to a ground surface.

As to a further discussion of the manner of usage and operation of the present invention, the same should be apparent from the above description. Accordingly, no further discussion relating to the manner of usage and operation will be provided.

Thus, while the present invention has been shown in the drawings and fully described above with particularity and detail in connection with what is presently deemed to be the most practical and preferred embodiment(s) of the invention, it will be apparent to those of ordinary skill in the art that many modifications thereof may be made without departing from the principles and concepts set forth herein, including, but not limited to, variations in size, materials, shape, form, function and manner of operation, assembly and use.

Hence, the proper scope of the present invention should be determined only by the broadest interpretation of the appended claims so as encompass all such modifications as well as all relationships equivalent to those illustrated in the drawings and described in the specification.

Finally, it will be appreciated that the purpose of the Abstract provided at the beginning of this specification is to enable the U.S. Patent and Trademark Office and the public generally, and especially the scientists, engineers and practitioners in the art who are not familiar with patent or legal terms of phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

What is claimed as being new and desired to be protected by Letters Patent of the United States is as follows:

1. A wheel assembly for use with a snowmobile having at least one ski support, the ski support having at least one ski member mounted thereon, the wheel assembly comprising:

a pair of spaced lock flanges mounted onto the ski member defining a flange gap therebetween, with the lock flanges each having an individual lock bore therewithin, and each lock bore coaxially aligned with an adjacent lock bore;

a support tube spaced from said lock flanges, with the support tube mounted upon the ski member, the support tube having a slot aligned with the flange gap;

a U-shaped wheel support bracket rotatably mounted partially within the support tube, the wheel support bracket having a plurality of legs;

a plurality of wheel members, with each of said wheel members being rotatably mounted to an individual one of the legs;

a latch leg integrally mounted to the U-shaped wheel support bracket, with the latch leg projecting through the slot and arranged for reception within the flange gap, with the latch leg having a latch leg opening, the latch leg opening being arranged for alignment with the lock bores when the latch leg is positioned within the flange gap;

and, a lock pin removably positioned through the latch leg opening and the latch bores.

2. The wheel assembly of claim 1, and further comprising a lock pin handle coupled to said lock pin.

* * * * *